US 6,699,154 B2

(12) United States Patent
Orr et al.

(10) Patent No.: US 6,699,154 B2
(45) Date of Patent: Mar. 2, 2004

(54) DIFFERENTIAL GEAR ASSEMBLY

(75) Inventors: Brian Christian Orr, Macomb, MI (US); Richard Michael Krzesicki, Ann Arbor, MI (US); John Edward Rutt, Macomb, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 44 days.

(21) Appl. No.: 10/062,073

(22) Filed: Jan. 31, 2002

(65) Prior Publication Data

US 2003/0144107 A1 Jul. 31, 2003

(51) Int. Cl.[7] .......................... F16H 48/06; F16H 57/08
(52) U.S. Cl. .......................... 475/230; 475/331; 74/640
(58) Field of Search ................................. 475/230, 220, 475/331; 74/650, 640

(56) References Cited

U.S. PATENT DOCUMENTS

| | | | | |
|---|---|---|---|---|
| 1,230,450 A | * | 6/1917 | Vincent ........................ 475/160 |
| 1,440,555 A | * | 1/1923 | Ross ............................. 475/230 |
| 1,657,091 A | * | 1/1928 | Morgan ........................ 475/246 |
| 3,675,459 A | | 7/1972 | Dohmann ..................... 181/11 A |
| 3,741,343 A | | 6/1973 | Lindenfeld et al. ............ 74/713 |
| 3,874,251 A | | 4/1975 | Lapitsky et al. ............... 74/713 |
| 4,125,026 A | | 11/1978 | Torli et al. ..................... 74/713 |
| 4,688,962 A | | 8/1987 | Koltookian .............. 403/408.1 |
| 4,754,661 A | | 7/1988 | Barnett ........................ 74/459.5 |
| 4,949,456 A | | 8/1990 | Kovach et al. |
| 5,098,355 A | * | 3/1992 | Long ............................. 475/220 |
| 5,480,360 A | * | 1/1996 | Patzer et al. .................. 475/230 |
| 5,520,589 A | | 5/1996 | Dewald et al. ............... 475/231 |
| 5,584,777 A | * | 12/1996 | Sander et al. ................ 475/230 |
| 5,823,980 A | * | 10/1998 | Kopfer ............................. 602/21 |
| 5,980,416 A | * | 11/1999 | Gafvert ......................... 475/230 |
| 6,368,242 B1 | * | 4/2002 | Irwin ............................. 475/230 |

FOREIGN PATENT DOCUMENTS

| | | | |
|---|---|---|---|
| DE | 4042174 A1 * | 7/1992 | ............. F16H/1/40 |
| DE | 10136777 | 2/2003 | |
| JP | 02190655 A * | 7/1990 | ........... F16H/57/02 |
| JP | 10061748 | 3/1998 | |

* cited by examiner

*Primary Examiner*—Tisha D Lewis
(74) *Attorney, Agent, or Firm*—Brinks Hofer Gilson & Lione

(57) ABSTRACT

A differential gear assembly including a differential housing, a pair of side gears substantially axially aligned and spaced apart from each other supported by the differential housing and engaging an axle half-shaft, and a plurality of pinion gears substantially axially aligned and spaced apart from each other. The pinion gears engage the side gears and include an outwardly facing first side and an inwardly facing second side. A ring gear is mounted externally to the differential housing and includes features which engage the first sides of the pinion gears to support the pinion gears within the differential gear assembly while allowing rotational movement of the pinion gears.

14 Claims, 4 Drawing Sheets

DIFFERENTIAL GEAR ASSEMBLY

BACKGROUND OF INVENTION

1. Technical Field of the Invention

The present invention generally relates to a differential gear assembly wherein pinion gears are supported within a differential housing such that the differential housing can be made lighter. More specifically, the present invention relates to a differential gear assembly wherein the pinion gears are supported directly by a ring gear.

2. Description of the Prior Art

In an automotive vehicle, a differential gear assembly is used to transfer power from a rotating driveshaft to the axles and wheels of the vehicle. The rotating driveshaft of the vehicle engages a ring gear which is mounted onto a differential housing. The end of the driveshaft and the ring gear are adapted to transfer rotation from the drive shaft to the differential housing such that the differential housing rotates transverse to the driveshaft. Within the differential housing, the ends of the axles of the vehicle are supported and connected to the differential housing through a differential gear set, such as a bevel differential gear set. Thus, the ring gear of the differential housing allows the driveshaft to rotate the differential housing in a direction transverse to the driveshaft, whereby the differential gear set rotates the axles of the vehicle to drive the wheels of the vehicle.

Typically the differential gear set includes a pair of side gears which are attached directly to the axles, and a pair of pinion gears which intermesh with the side gears. Most commonly, the pinion gears are supported by a pinion pin which extends across the differential housing. The pinion gears are allowed to rotate on the pinion pin thereby allowing the vehicle axles to rotate relative to one another.

The rotational load is thus transferred from the driveshaft, to the ring gear, through the differential housing and to the pinion pin. Therefore, the differential housing must be large and thick so as to support the load being transferred therethrough. Additionally, the weakest link in a conventional differential gear assembly is the pinion gear because the pinion gear has a hole extending therethrough to receive the pinion pin.

As seen from the above, there is a need to improve the structural integrity of a differential gear assembly while also decreasing weight.

It is therefore an object of this invention to provide a differential gear assembly with a differential housing and a ring gear having features which allow the pinion gears to be supported directly by the ring gear, thereby eliminating the pinion pin and the need for a hole through the pinion gears, removing the differential housing from the load path, and allowing the differential housing to be designed with less structural size and weight.

SUMMARY OF THE INVENTION

The disadvantages of the prior art are overcome by providing a differential gear assembly, in accordance with the present invention, in which the pinion gear is attached directly to the ring gear, thereby removing the differential housing from the load path, and eliminating the pinion pin and the hole through the pinion gear.

In the present invention, the differential gear assembly includes a plurality of pinion gears having an outwardly facing first side and an inwardly facing second side and a ring gear which engages the first side of the pinion gears such that the pinion gears are rotationally supported directly by the ring gear.

Also in the present invention the ring gear includes a plurality of recesses spaced radially thereabout and each of the pinion gears includes a projection extending from the first side, whereby each of the recesses receives one of the projections. The differential gear assembly further includes a first support ring having a plurality of holes formed thererein and each of the pinion gears includes a recess formed within the second side thereof. Each one of the holes is aligned with a recess of one of the pinion gears and a dowel or pin is inserted within each of the holes so as to extend into the recess.

In yet another aspect of the present invention, the differential gear assembly includes a second support ring adapted to fit within the first support ring thereby secure the pins within the holes.

DETAILED DESCRIPTION OF THE PREFERRED EMBODIMENTS

Figure 1:
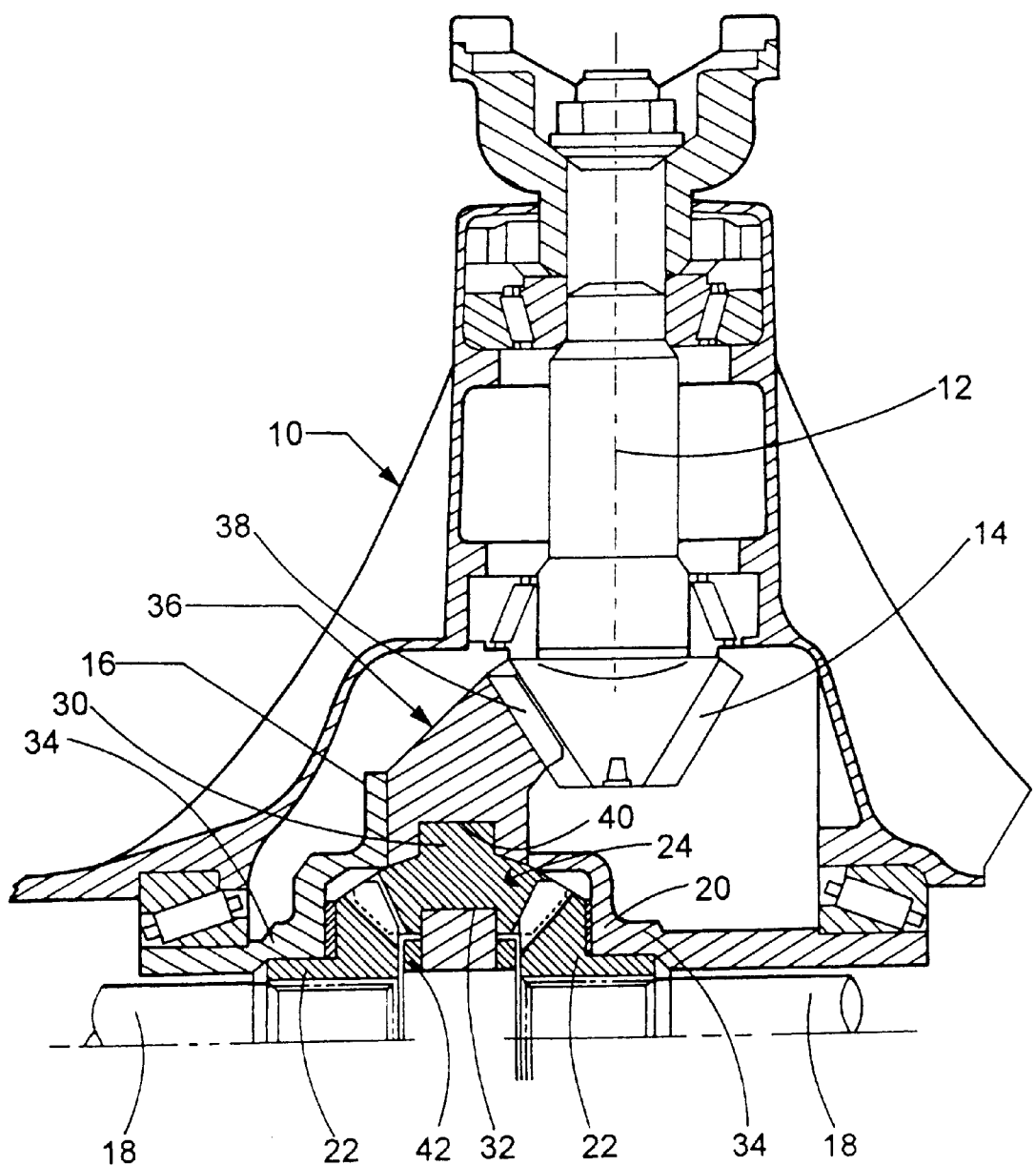
FIG. 1 is a partial sectional view of a differential assembly having a differential gear assembly of the present invention including the drive-shaft and input pinion shown in engagement with the differential gear assembly.

A differential assembly having a differential gear assembly of the present invention is shown generally at 10 in FIG. 1. The differential assembly 10 includes a drive-shaft 12 which transfers rotational power from the engine of the vehicle to the differential assembly 10. The drive-shaft 12 includes an input gear 14, such as a bevel gear, mounted at is end to engage a differential gear assembly 16.

In FIG. 1 only half of the differential gear assembly 16 is illustrated therein. The non-illustrated half is, however, a mirror image of the illustrated half. Accordingly, those skilled in the field will readily appreciate the full construction of the gear assembly 16 without requiring such a full illustration.

The differential gear assembly 16 generally includes a differential housing 20 and a pair of side gears 22 which are substantially axially aligned and spaced apart from each other while being supported within the differential housing 20. Each of the side gears 22 is attached to an end of an axle half-shaft 18 of the vehicle.

A plurality of pinion gears 24 (one being shown), which are substantially axially aligned and spaced apart from each other, are supported within the differential housing 20 as explained hereinafter. Each of the pinion gears 24 engages the side gears 22. The pinion gears 24 have an outwardly facing first side 26 and an inwardly facing second side 28. Furthermore, the first side 26 includes an outwardly extending projection 30 while the second side 28 includes a recess or hole 32 extending partially therethrough.

The differential housing 20 includes a pair of extending neck portions 34, each of which are rotatably supporting a proximal end of one of the axle half-shafts 18. The distal ends of each of the axle half-shafts 18 are connected to a wheel of the vehicle. The proximal end of each of the axle half-shafts 18 has secured thereon one of the side gears 22, with the side gears 22 being engaged with the pinion gears 24. As such, rotation of the differential housing 20 is transferred through the pinion gears 24, to the side gears 22 and to the axle half-shafts 18, all while allowing the axle half-shafts 18 to rotate relative to one another.

A ring gear 36 is mounted externally to the differential housing 20. The ring gear 36 is generally annularly shaped having a substantially circular inner surface and a plurality of circumferentially spaced teeth 38 extending obliquely from a side face of the ring gear 36. As such, the ring gear 36 is a bevel ring gear. The teeth 38 are adapted to provide smooth engagement with corresponding teeth on the input bevel gear 14, which is mounted to of the drive shaft 12 of the vehicle.

The ring gear 36 further includes a plurality of recesses 40 spaced radially thereabout. Each of the recesses 40 receives the projection 30 extending from the first side 26 of one of the pinion gears 24. Appropriate features, such as bearings rotatably mount to the pinion gears 24 to the ring gear 36 for rotation about the projection 30.

Therefore, the load from the drive-shaft 12 is transferred directly from the ring gear 36 to the pinion gears 24. Preferably, the ring gear 36 and the pinion gears 24 are formed from hardened steel, however it is to be understood that other materials with similar hardness and strength properties could be used with substantially equal results.

Figure 2:
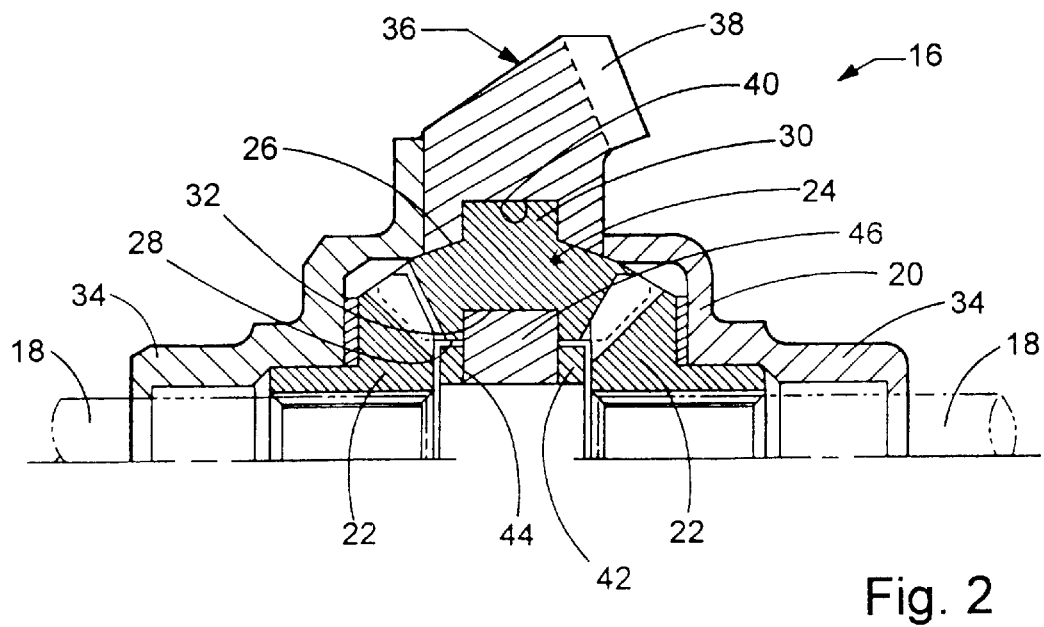
FIG. 2 is a partial sectional view of a first preferred embodiment of the differential gear assembly of the present invention including a first support ring with pins to secure pinion gears in engagement with a ring gear.

When the vehicle is operating at ordinary speed and the differential gear assembly is rotating, the centrifugal loads experienced by the gears 22, 24 will maintain the pinion gears 24 in engagement with the ring gear 36. However, when the differential gear assembly 16 is spinning slowing, or not at all, the pinion gears 24 might disengage from the ring gear 36 if not otherwise retained. Therefore, a first support ring 42 (FIGS. 1, 2 and 3) is placed between the pinion gears 24 to provide radial support for the pinion gears 24 and maintain engagement of the pinion gears 24 with the ring gear 36.

Figure 3:
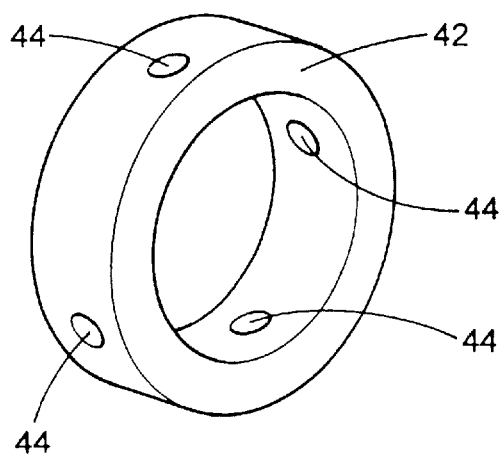
FIG. 3 is a perspective view of the support ring shown in FIG. 2 with the support ring haveing four holes for use in a differential gear assembly having four pinion gears.
Figure 4:
FIG. 4 is a perspective view of the pin shown in FIG. 2.
Figure 5:
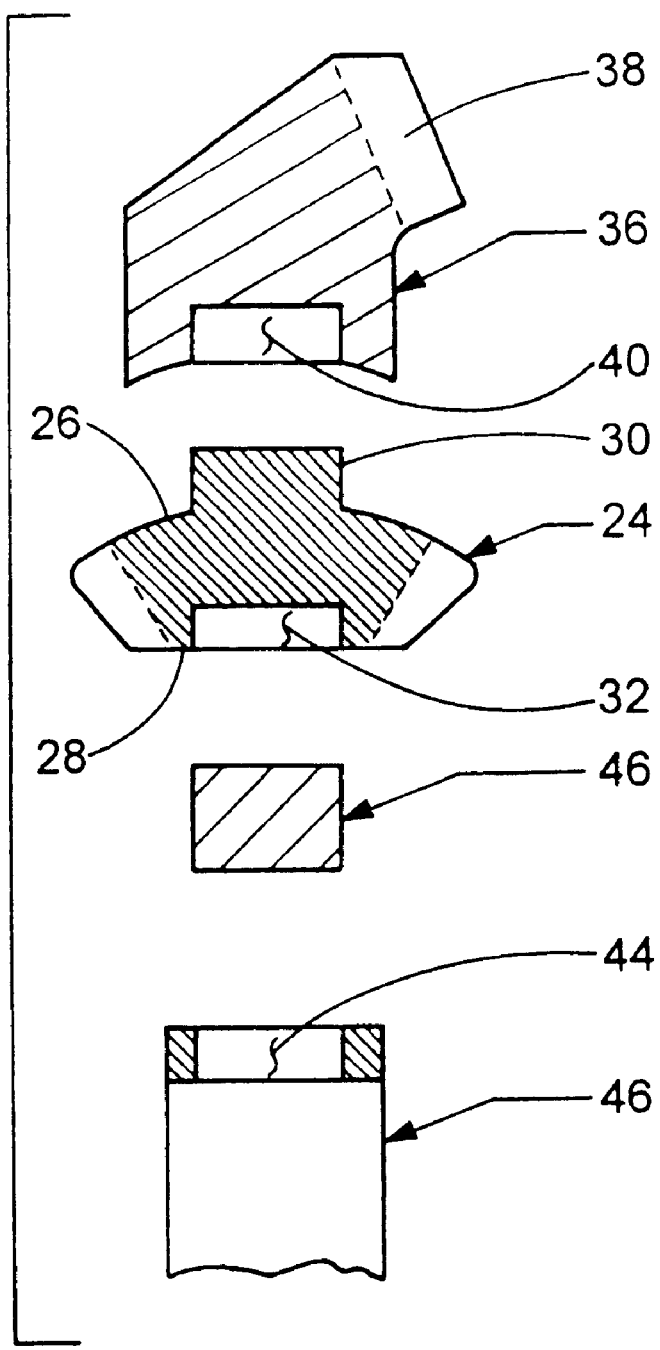
FIG. 5 is a partial sectional exploded view showing the ring gear, a pinion gear, a pin and the first support ring.

The first support ring 42 has a plurality of holes 44 provided therein and extending therethrough. As shown in FIG. 3, the first support ring 42 has a total of four holes 44, whereby one of the four holes 44 is aligned with the recesses 32 formed in the second side 28 of each of four pinion gears 24 used in the assembly 16. The present invention could also be practiced with only two pinion gears 24, whereby the first support ring 42 would only require two holes 44 therein. Pins 46, one of which is shown in FIG. 4, are inserted within the holes 44 and extend into the recesses 32 to secure the pinion gears 24 to the first support ring 42. Referring to FIG. 5, an exploded view of the ring gear 36, one of the pinion gears 24, a dowel 46 and the first support ring 42 more clearly illustrates the features of these components. In a preferred embodiment, the pins 46 are held within the first support ring 42 by either press fitting of the pins 46 within the holes 44 or, alternatively, by welding the pins 46 within the holes 44.

Figure 6:
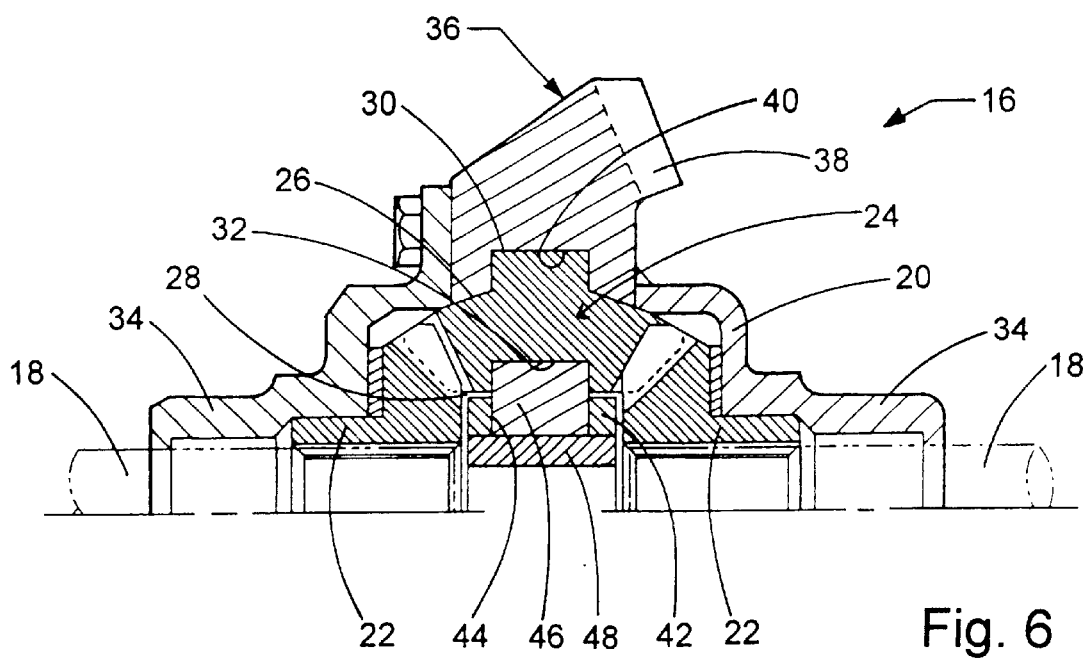
FIG. 6 is a partial sectional view of a second preferred embodiment of the differential gear assembly of the present invention including a second support ring which secures the pins within the holes of the first support ring.
Figure 7:
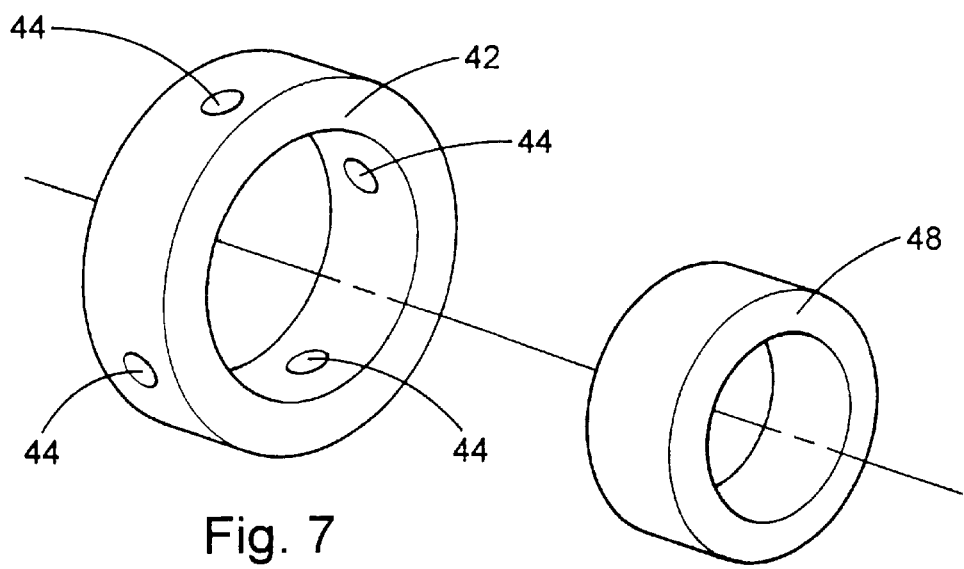
FIG. 7 is an exploded view of the support rings.

As an alternate to press fitting or welding, and as seen in FIGS. 6 and 7, in an alternative embodiment, the pins 46 are held within the holes 44 of the first support ring 42 by a second support ring 48. The second support ring 48 has an out diameter approximately the inner diameter of the first support ring 42 and is not provided with any holes therethrough. As such, the ring 48 provides radial support for the pins 46 and keeps the pins 46 retained within the holes 44 of the first support ring 42.

The foregoing discussion discloses and describes two preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A differential gear assembly comprising:

a differential housing;

a pair of side gears substantially axially aligned and spaced apart from each other, each of said side gears being supported by said differential housing for relative rotation therebetween and being adapted to engage an axle shaft;

a plurality of pinion gears substantially axially aligned and spaced apart from each other, said pinion gears engaging said side gears and including an outwardly facing first side and an inwardly facing second side;

a ring gear mounted generally externally to said differential housing, engaged with said first sides of said pinion gears to support said pinion gears within said differential gear assembly while allowing rotational movement of said pinion gears; and a first support ring adapted to engage said second sides of said pinion gears to at least aid in retaining said pinion gears in engagement with said ring gear, said first support ring including a plurality of holes formed therein and each of said pinion gears including a recess formed within said second side, each one of said plurality of holes being aligned with one of said recesses of one of said pinion gears, said differential gear assembly further including a plurality of pins inserted within said holes and extending into said recesses to rotatably secure said pinion gears to said first support ring;

portions formed on said ring gear engaging portions formed on said pinion gears such that said pinion gear is rotatable relative to said ring gear.

2. The differential gear assembly of claim 1 wherein a portion of said ring gear includes a plurality of recesses spaced radially thereabout and wherein said portions of each of said pinion gears includes a projection extending from said first side, whereby each of said recesses receives one of said projections to rotatably retain said pinion gears to said ring gear.

3. The differential gear assembly of claim 1 wherein said holes within said first support ring have an inner diameter and said pins have an outer diameter such that when said pins are inserted within said holes, there is an interference fit such that said pins are secured within said holes by friction between said outer diameter of said pins and said inner diameter of said holes.

4. The differential gear assembly of claim 1 wherein said pins are welded within said holes.

5. The differential gear assembly of claim 1 further including a second support ring adapted to fit within said first support ring to secure said pins within said holes.

6. The differential gear assembly of claim 5 wherein said first support ring has an inner diameter and said second support ring has an outer diameter such that when said second support ring is inserted within said first support ring, there is an interference fit such that said second support ring is secured within said first support ring by friction between said outer diameter of said second support ring and said inner diameter of said first support ring.

7. The differential gear assembly of claim 5 wherein said second support ring is welded within said first support ring.

8. The differential gear assembly of claim 1 wherein said pinion gears and said ring gear are formed from hardened steel.

9. A differential gear assembly comprising:

a differential housing;

a pair of side gears substantially axially aligned and spaced apart from each other, each of said side gears supported by said differential housing and adapted to engage an axle shaft;

a plurality of hardened steel pinion gears substantially axially aligned and spaced apart from each other, each of said pinion gears being adapted to engage said side gears and including an outwardly facing first side having a projection extending therefrom and an inwardly facing second side having a depression formed therein;

a hardened steel ring gear mounted externally to said differential housing and having a plurality of depressions spaced radially thereabout, each depression engaging one of said projections to support said pinion gears within said differential gear assembly while allowing rotational movement of said pinion gears;

a support ring having a plurality of holes formed therein, each of said plurality of holes being aligned with said depression of one of said pinion gears; and a plurality of dowels inserted within said holes and extending into said depressions to rotatably secure said pinion gears to said support ring.

10. The differential gear assembly of claim 9 wherein said holes within said support ring have an inner diameter and said dowels have an outer diameter such that when said dowels are inserted within said holes, there is an interference fit such that said dowels are secured within said holes by friction between said outer diameter of said dowels and said inner diameter of said holes.

11. The differential gear assembly of claim 9 wherein said dowels are welded within said holes.

12. A differential gear assembly comprising:

a differential housing;

a pair of side gears substantially axially aligned and spaced apart from each other, each of said side gears supported by said differential housing and adapted to engage an axle shaft;

a plurality of hardened steel pinion gears substantially axially aligned and spaced apart from each other, each of said pinion gears being adapted to engage said side gears and including an outwardly facing first side having a projection extending therefrom and an inwardly facing second side having a depression formed therein;

a hardened steel ring gear mounted externally to said differential housing and having a plurality of depressions spaced radially thereabout, each depression engaging one of said projections to support said pinion gears within said differential gear assembly while allowing rotational movement of said pinion gears;

a first support ring having a plurality of holes formed therein, each of said plurality of holes being aligned with said depression of one of said pinion gears;

a plurality of dowels inserted within said holes and extending into said depressions to rotatably secure said pinion gears to said first support ring; and a second support ring adapted to fit within said first support ring to secure said dowels within said holes.

13. The differential gear assembly of claim 12 wherein said first support ring has an inner diameter and said second support ring has an outer diameter such that when said second support ring is inserted within said first support ring, there is an interference fit such that said second support ring is secured within said first support ring by friction between said outer diameter of said second support ring and said inner diameter of said first support ring.

14. The differential gear assembly of claim 12 wherein said second support ring is welded within said first support ring.

* * * * *